United States Patent
Tilander et al.

(10) Patent No.: US 7,403,992 B2
(45) Date of Patent: Jul. 22, 2008

(54) ADAPTIVE CONNECTION CACHE FOR COMMUNICATION NETWORKS

(75) Inventors: Sami Tilander, Peritula (FI); Henri Tervonen, Espoo (FI)

(73) Assignee: Nokia Corporation, Espoo (FI)

( * ) Notice: Subject to any disclaimer, the term of this patent is extended or adjusted under 35 U.S.C. 154(b) by 932 days.

(21) Appl. No.: 10/615,946

(22) Filed: Jul. 10, 2003

(65) Prior Publication Data

US 2005/0027852 A1 Feb. 3, 2005

(51) Int. Cl.
*G06F 15/173* (2006.01)

(52) U.S. Cl. .................. 709/224; 709/227; 709/231; 709/245; 370/395.2

(58) Field of Classification Search .................. 709/223, 709/224, 227, 231, 245; 370/395.2
See application file for complete search history.

(56) References Cited

U.S. PATENT DOCUMENTS

| | | | | |
|---|---|---|---|---|
| 6,173,322 | B1 * | 1/2001 | Hu | 709/224 |
| 6,434,152 | B1 * | 8/2002 | Yamamura | 370/395.2 |
| 6,822,961 | B1 * | 11/2004 | Constantinof et al. | 370/395.2 |
| 7,222,169 | B2 * | 5/2007 | Koshimizu et al. | 709/224 |
| 2002/0181470 | A1 | 12/2002 | Agnevik et al. | |
| 2003/0039256 | A1 | 2/2003 | Carlberg et al. | |
| 2003/0112788 | A1 | 6/2003 | Erhart et al. | |
| 2004/0228279 | A1 * | 11/2004 | Midtun et al. | 370/236 |

FOREIGN PATENT DOCUMENTS

| | | |
|---|---|---|
| KR | 10-2001-0082960 | 12/2001 |
| WO | WO 01/67786 | 9/2001 |
| WO | WO 01/84876 A1 | 11/2001 |
| WO | WO 03/047276 A2 | 6/2003 |

OTHER PUBLICATIONS

International Search Report PCT/FI 2004/000363 filed Jun. 11, 2004.
Translation of Korean Office Action, dated Aug. 12, 2007, for Korean Appln. No. 7000430/2006.

* cited by examiner

*Primary Examiner*—Oanh Duong
(74) *Attorney, Agent, or Firm*—Squire, Sanders & Dempsey LLP

(57) ABSTRACT

A method and system for improving the session establishment or modification performance of a switching system. Statistics associated with the use of session resources within the switching system are collected. Based on these statistics a given session resource is recorded to a connection cache to become reusable for subsequent sessions. In subsequent session establishment or modification within the switching system the connection cache is checked whether there is any matching session resources. If a matching session resource is found, it is used in the establishment of the communication paths pertaining to the session to be established or modified.

27 Claims, 7 Drawing Sheets

ADAPTIVE CONNECTION CACHE FOR COMMUNICATION NETWORKS

BACKGROUND OF THE INVENTION

Field Of The Invention

The invention relates to telecommunications networks. Examples of such networks are Asynchronous Transfer Mode (ATM) networks, frame relay networks, Internet Protocol (IP) and Synchronous Digital Hierarchy (SDH) networks. Particularly, the invention relates to wireless multimedia switching systems and an adaptive connection cache that improves their performance.

In the last few years there has been a converging trend in telecommunication network transport technologies. This means that there is a unified technology for transporting various media, for instance, network signaling, voice, video and data. At the transport layer, media is carried using a unified packet format, and only on a higher protocol layer there is a distinction between media types. An example of such a unified media transport technology is the Asynchronous Transfer Mode (ATM).

Packet switching is a general term for a number of interrelated technologies including, for instance, datagram packet switching and virtual circuit packet switching. Virtual circuit packet switching (VC switching) is a packet switching technique, which is a kind of hybrid of datagram packet switching and circuit switching and combines their advantages. VC switching is a variation of datagram packet switching where packets flow on so-called logical circuits, for which no physical resources like frequencies or time slots or single physical circuits are allocated. Each packet carries a circuit identifier that is local to a link and updated by each switch on the path of the packet from its source to its destination. A virtual circuit is defined by the sequence of the mappings between a link taken by packets and the circuit identifier packets carried on this link. The sequence is set-up at connection establishment time and identifiers are reclaimed during the circuit termination.

Lately, since the introduction of Internet Protocol (IP) multimedia, Internet Protocol (IP) has also been used as such a unified media transport technology. The ATM uses short, fixed length packets that are referred to as cells. An ATM cell comprises a five byte header, which is used by the network to deliver the cell to the destination, and a 48 byte body that contains data, which may represent part of voice, video or data transmission i.e. communication path being sent across the network. The cell header also provides the network with the ability to control congestion. The cell header also comprises a Virtual Path Identifier (VPI) and a Virtual Channel Identifier (VCI). The VCI and/or VPI are used for cell switching in an ATM switch. A Virtual Channel (VC) is a unidirectional flow of ATM cells between two connecting (switching or end-user) points that share a common identifier number (VCI). A Virtual Channel Connection (VCC) is a concatenation of virtual channel links. Virtual channels in two or more sequential physical circuits can be concatenated to create an end-to-end connection, referred to as a VCC. More information on the ATM can be found in the book "ATM: The New Paradigm for Internet, Intranet and Residential Broadband Services and Applications", Timothy Kwok, Prentice Hall, 1998.

The upper layer of the ATM is the ATM Adaptation Layer (AAL). The AAL layer uses currently three different types of adaptation, namely: AAL1, AAL2 and AAL5. For instance AAL1 is used for fixed bitrate circuit emulation whereas AAL5 is used for connectionless non-real-time undefined bitrate services. AAL2 is used for variable bitrate real-time services, especially for compressed voice. Only AAL2 is discussed more closely herein. According to AAL specifications an AAL is divided in two sublayers: the upper sublayer of which is the Convergence Sublayer (CS) and the lower sublayer is the Segmentation And Reassembly (SAR). The convergence sublayer is further divided in the Common Part Convergence Sublayer (CPCS) and the Service Specific Convergence Sublayer (SSCS). The CPCS and SAR are further referred to as the Common Part (CP).

The common part for AAL2 i.e. AAL2-CP achieves both low packetization delay and high bandwidth efficiency by allowing variable packet length from 1 octet to 45 octets and by multiplexing several AAL2 connections in a single ATM virtual channel connection (VCC). An AAL2-CP packet consists of a 3-octet header and up to 45 octets of payload. The length of the payload is indicated in the "length indicator" (LI) field. A "user-to-user" (UUI) field has been included for upper layers (users) to transparently convey information (e.g. some SSCS use it to convey a sequence number and/or the type of voice-codec used). An 8 bit Connection Identifier (CID) is used to identify individual AAL2 connections inside a single AAL2 link (ATM VCC set up for the transport of AAL2 traffic). Sometimes a bundle comprising more than one multiplexed AAL2 connection is referred to as an N-CID. Switching at AAL2 level is possible by making an association between incoming and outgoing connection CIDs in a switch.

A prior art AAL2 capable switching system is illustrated in FIG. 1. The AAL2 switching system comprises an ATM switch core 100 that performs the switching of ATM level packets between connection slots controlled by the switch controller. The switch controller configures the connection slots in order to connect input ports and output ports. Connected to the switch core is a number of multiplexing/demultiplexing units (M) 110-113. The multiplexing/demultiplexing units are herein referred to simply as multiplexers for clarity. There is a number of Network Interface Units (NIU) to which connections 102-104 to the external network can be attached. Each NIU is connected to a given multiplexing/demultiplexing unit (M). Slow network interface NIU 120 is connected to the ATM switching core via a multiplexing/demultiplexing unit whereas fast network interface NIU 128 is directly connected to the ATM switching core. There is also a number of AAL2 switching processors (A2SP) 122, 126 that perform AAL2 level switching and are aware of individual AAL2 connections. The A2SPs demultiplex the AAL2 connections from a given VCC. A2SP 122 connects an incoming AAL2 connection 140 to an ATM level connection 150 comprising user data only from a single AAL2 connection via an association 160. In another transfer direction A2SP 126 connects an incoming ATM level connection 152 to an outgoing AAL2 connection 154 via an association 162. The incoming or outgoing ATM level connections 150, 152 can be connected to a tributary processor group 124, which contains a Digital Signaling Processor (DSP) application. The DSP applications may perform various functions to one or many received media stream(s) and provide one or many altered media stream(s) in output. Examples of such functions are ciphering/deciphering, voice or video transcoding and macro diversity combining.

A more precise view of the function of the AAL2 switching system follows in a case where a DSP application is applied to a media stream switched through the AAL2 switching system. An incoming cell stream 140 associated with a given VCC and AAL2 connection 140 is received by a NIU. There are a number of AAL2 connections multiplexed to the VCC.

Such a bundle of related AAL2 connections is referred to herein also as an N-CID connection. The VCC is connected to multiplexer 110 and fed via it to ATM switch core 100, which takes care of ATM cell switching i.e. ATM level switching. ATM switch core 100 switches the VCC to multiplexer 111, which in turn connects the VCC to A2SP 122. A2SP 122 demultiplexes the AAL2 connections from the VCC and connects each individual AAL2 connection, for example AAL2 connection 140, to its own ATM level connection, for example ATM level connection 150. The ATM level connection 150 is switched by ATM switching core 100 to multiplexer 112 that connects it to a TPG and a DSP application in a Computer Unit 130, 132 in association with it. The DSP application is manipulating the ATM level connection cell stream and it is fed into ATM level connection 152. ATM level connection 152 is switched by ATM switch core 100 to multiplexer 113 that connects ATM level connection 152 to A2SP 126. ATM level connection 152 is switched by A2SP 126 to AAL2 connection 142. AAL2 142 connection is multiplexed by A2SP 126 together with a number of other AAL2 connections to an outgoing cell stream of an outgoing VCC. The outgoing cell stream thus carries cells belonging to AAL2 connection 142.

ATM and AAL2 switching is used in wireless multimedia networks such as the Universal Mobile Telecommunications System (UMTS). AAL2 is used to carry various signaling and media channels in UMTS Radio Access Network (RAN).

A reference is now made to FIG. 2A, which illustrates the RAN 200 part of a UMTS system. User equipment (UE) 218 has reserved for use a number of radio access bearers 222, at least when UE 218 is active and has at least one call and/or a packet data context activated. Typically, for a UMTS UE in call and/or active packet data connection state, there can be four different radio access bearers, for example, one for Dedicated Control signaling CHannel (DCCH), one for Adaptive Multirate (AMR) coded speech, one for non-real time data and one for real-time data. There is a number of Base Transceiver Stations (BTS) 210-212. The radio access bearers are carried in RAN 200 within ATM AAL2 connections 220. There is one connection for each individual radio access bearer. AAL2 connections 220 from the BTSes 210-212 are connected to Radio Network Controller (RNC) 214, which takes care of several functions pertaining to the UMTS radio network, for instance, macro diversity combining, ciphering/deciphering, radio channel allocation, handovers etc. RNC 214 has associated with it an AAL2 switching system comprising an ATM switching core 100. RNC 214 is connected on the Core Network (CN) 202 side of the UMTS system to a Media Gateway (MGW) 216. RNC 214 performs the switching of connections between the BTS side connections 220 and connections towards MGW 216. RNC 214 has TPGs and computer units hosting DSP applications for performing e.g. macro diversity combining and ciphering/deciphering.

A reference is now made to FIG. 2B, which illustrates prior art UMTS RNC 214 structure. The RNC comprises Switching Fabric Unit (SFU) 100, which is equivalent to ATM switch core 100, multiplexing/demultiplexing units 250-256, network interface units 260-263, control computers 270-273 controlling the switching system i.e. RNC. Examples of such control computers are ICSU (signaling unit) 270 that contains, for example, call control applications such as 350, RRMU (radio resource management unit) 271 and OMU (operations and maintenance unit) 273. The RNC has also AAL2 switching units i.e. A2SPs 265, 266.

In ATM switching applications, user plane virtual channels are switched from an ingress interface to an egress interface directly when AAL2 switching is not used. In the RNC case the situation is somewhat more complex, as RNC also performs digital signal processing functions for the data going through the RNC. The UMTS RNC represents an example of an AAL2 switching system. However, there are additional components such as the unit for macro diversity combining 268 and the DSP application for it 267. The figure depicts a case where there are three macro diversity legs i.e. branches 280, 281, 282 for a given UE. Legs 280 and 281 lead to BTSs under the control of RNC 214. Leg 282 leads to a BTS under the control of an another RNC i.e. a drift RNC via UMTS Iur-interface. A macro diversity combining application 267 performs the combining of user plane data from the UE. The combined user plane data i.e. traffic is forwarded via leg 283 that leads to AAL2 switching unit 265. The interface between the RNC and core network is referred to as UMTS Iu-interface. Leg 280 is started from a BTS behind the UMTS Iub interface and goes via multiplexing/demultiplexing units (MXU) 250, 254 and SFU 100 to AAL2 switching unit 266, where the switching of AAL2 packets to internal ATM VCCs is done. Further the leg 280 goes to macro diversity combining unit 268 and is ended there. Leg 281 and Leg 282 are handled in similar way. The leg 284 is started from the core network i.e. MGW behind the Iu-interface and goes via multiplexer 254 and switching fabric unit 100 to AAL2 switching unit 265 and is ended there. Finally, an AAL2 connection performed to the AAL2 switching unit 265 connects the leg 283 to the leg 284.

Drawbacks of the prior art solutions are that in a switching system such as described, especially when used in the context of a system such as UMTS that uses several parallel AAL2 connections per one user, the preparing of connections for the user becomes slow and introduces significant delays to, for example, call set-up times. A first type of the delay is due to the structure of an AAL2 switching system, where the preparing of an AAL2 connection between an input AAL2 connection and an output AAL2 connection via a DSP application hosted in a computer unit in association with a TPG 124 involves four ATM level switching connections 154, 150, 152, 156 via the ATM switching core and two AAL2 level connections within A2SPs 160, 162. The managing i.e. performing of the ATM level switching connections in the ATM switching core and AAL2 level connections in the A2SPs takes a certain minimum time, which cannot be reduced without costly solutions e.g. by increasing the capacity of the ATM switching core. The delay causes problems in cases where rapid connection set-up is needed. One example of such a case is the paging of a UMTS UE, where a radio access bearer has to be set-up for the DCCH in order to carry call set-up signaling. Another type of the delay is due to the fact that there can be several parallel connections associated with a given user via an AAL2 switching system such as RNC. For instance, if four radio bearers are to be set-up for a MS within a RAN, there are four AAL2 connections via the RNC to the CN, thereby multiplying the number of ATM level and AAL2 level switching connections by the factor of four. As explained above in reference to FIG. 2B, the number of required connections increases in the case of macro diversity combining. In such a case there are also the macro diversity branches i.e. legs, that bring in an additional number of connections.

Similar drawbacks can be observed in a switching system utilizing multiple connections either due to switching on multiple protocol layers or due to multiple parallel connections per user or endpoint.

SUMMARY OF THE INVENTION

The invention solves the problems discussed before. Particularly, the invention speeds up the set-up of connections via a switching system.

The invention is a method for improving the session establishment or modification performance of a switching system. In the method statistics associated with the use of session resources pertaining to the switching system are collected; based on the statistics information pertaining to a session resource is recorded to a connection cache; in the processing of a session establishment or modification request the connection cache is checked for at least one matching session resource; and the matching session resource is used in the establishment of at least one communication path pertaining to the session establishment or modification request.

The invention is also a system for improving the session establishment or modification performance of a switching system. The system comprises means for switching communication paths; means for receiving session establishment or modification requests; means for collecting statistics of session resources used by the sessions pertaining to the session establishment or modification requests; a connection cache for recording information pertaining to the session resources based on the statistics; means for reusing a session resource, and the information of which has been stored in the connection cache, in the context of a new session establishment or modification request.

The invention is also a node for improving the session establishment or modification performance of a telecommunications system comprising one or many switching systems. The node further comprising: means for receiving session establishment or modification requests; means for collecting statistics of session resources sources used by sessions pertaining to the session establishment or modification requests; a connection cache for recording information pertaining to the session resources based on the statistics; and means for reusing a session resource, the information of which has been stored in the connection cache, in the context of a new session establishment or modification request.

In one embodiment of the invention the session resources comprise cross-connections in a switch, which can particularly be an ATM switch. The cross-connections are on the ATM level, that is, on cell switching level or on AAL2 level. If media manipulation by means of a DSP application is desired for the communication path, the session resources also comprise connections to computer units hosting DSP applications. The computer units and their DSP applications are connected to the communication path via ATM cross-connections. One or several media stream manipulation computer units or other equivalent circuitry is referred to hereinafter also as media stream processing means.

In one embodiment of the invention the matching utilizes at least one quality of service parameter pertaining to the session request. One typical example of such a parameter is the bitrate associated with a communication path pertaining to the session. In one embodiment of the invention the disclosed node is a radio network controller. In yet another embodiment of the invention, the computer units are grouped into at least one computer unit group, computer units from the computer unit group being preferred for sessions associated with pre-defined incoming or outgoing connections, that is, connections associated with a certain VCC.

The benefits of the invention are related to the performance of the switching system. The performance is increased due to the fact that the caching of connection information avoids the time consuming task of creating connections from starting at, for instance, ATM switching core, higher protocol level switches such as AAL2 switching units or other type of switching matrix. Instead, ready-made connections from previous calls can be reused at call control level. In the case of UMTS radio network controller (RNC), the invention is further improved by grouping computer units into computer unit groups so that a given group is associated with a group of incoming or outgoing connections. In this case the number of possible connections connecting different NIUs, A2SPs and TPGs is restricted. By forcing the connections to follow generally same paths and patterns in the switching system, the probability of creating reusable connections and the probability of finding them in the connection cache during subsequent use is increased.

It should be noted that throughout this disclosure by a switching system is meant any system capable of processing set-up requests pertaining to calls, packet data connections and IP multimedia sessions, and managing of cross-connections in one or many switching elements in order to establish communication paths pertaining to set-up request via said switching system.

It should also be noted that throughout this disclosure the term session refers to audio or multimedia calls, packet data connections, IP multimedia sessions or any kind of data transmission, which involves the setting up of switching connections in order to establish communication paths, for example AAL2 connections carrying e.g. a voice or video stream.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 3:
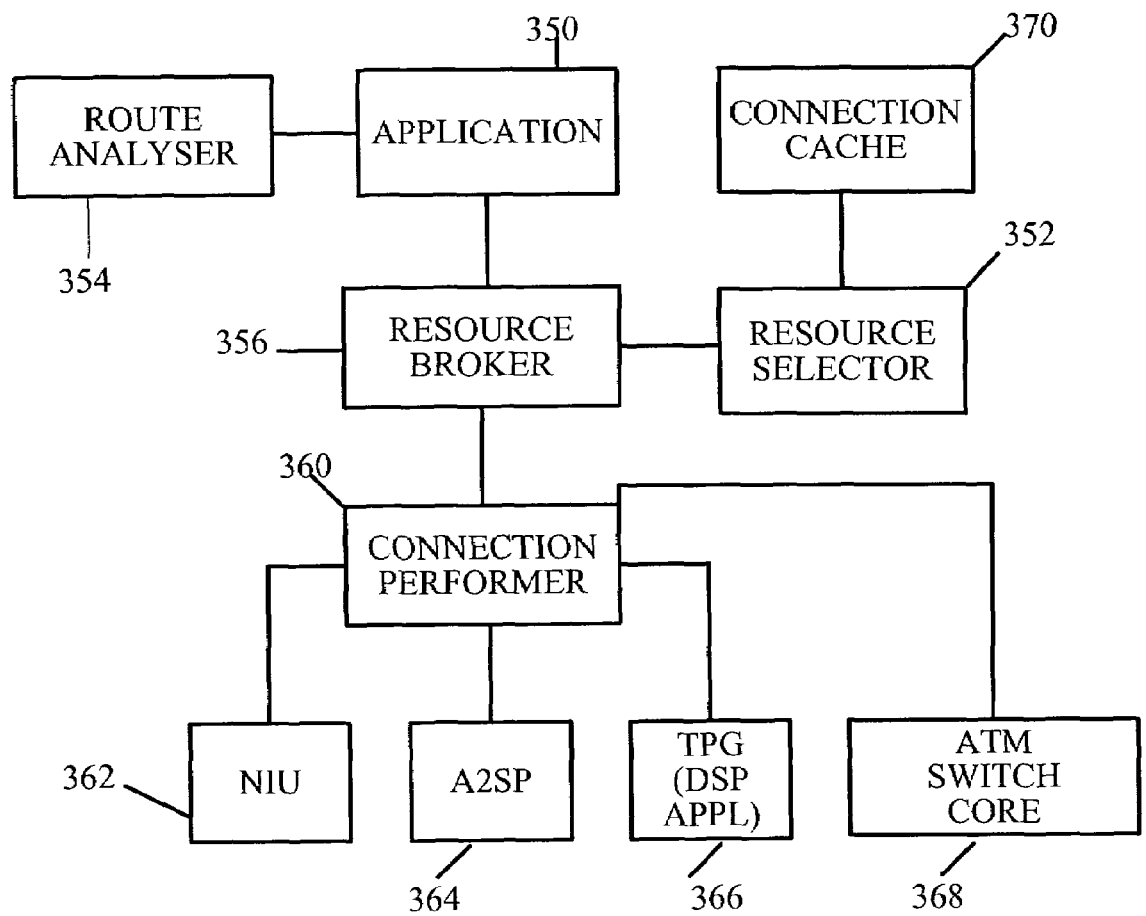
FIG. 3 is a block diagram depicting a system utilizing the connection cache of the invention in order to control an AAL2 switching system of FIG. 1.
Figure 4:
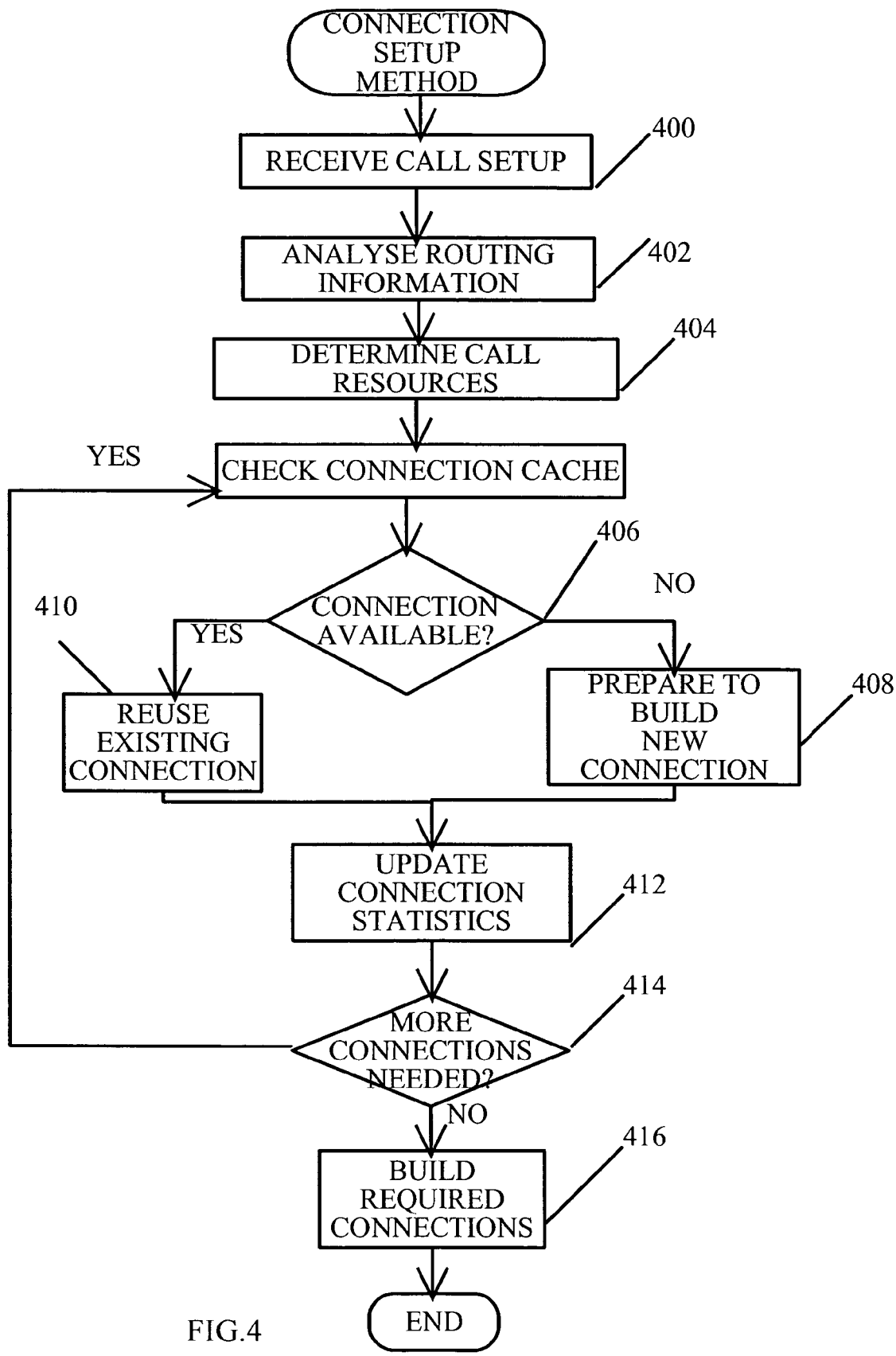
FIG. 4 is a flow chart depicting one embodiment of connection set-up in the system of FIG. 3, in accordance with the invention.

FIG. 4 illustrates a flow chart depicting one embodiment of connection set-up in the system of FIG. 3. The method applies to the establishment of any kind of sessions. Herein both are referred to as calls for simplicity. In turn the system of FIG. 3 is controlling a switching system of FIG. 1.

In step 400 a call set-up request is received by a call control application 350. It should be noted that by a call set-up request is meant throughout this disclosure any kind of connection request requiring the performing of a number of connections within the switching system in order to establish one or many communications paths via the switching system from a given origin to a given destination. Therefore, the term call set-up request is also used to refer to packet data connection and IP multimedia session set-up requests. Thus, call set-up requests could also be referred to as session set-up i.e. establishment requests. In one embodiment of the invention, the communication paths are AAL2 connections. In the context of a UMTS radio access network 200, the call set-up request may typically be a radio resource request issued from an idle mode UE to RNC 214. Similarly, it may be a paging request received from the core network side requiring the set-up of a signaling channel from the core network towards the UE via RNC 200. In an another type of multimedia system the call set-up request may be a request to set-up a multi-stream connection from user equipment via the switching system to an another user equipment.

In step 402 call control application 350 sends routing information carried in the call set-up request to route analyzer 354 to be analyzed. The routing information can be an address, which is used by the route analyzer 354 to determine the next hop for the call. Route analyzer 354 responds to call control application 350 to provide the route information to determine the next node in call routing. In the case of UMTS UE 218 paging, the route analysis can only determine the set of BTSes 210, 212 via which paging of UE 218 is to be performed. Only after the UE 218 has responded to the paging request, it is determined in RNC 200, under which BTS 210 the UE is currently camping and to which AAL2 connections 220 from RNC 200 are to be allocated.

In step 404 the required call resources are determined. This is possible after the routing information analysis at step 402 and the call control application have determined the next node, to which an outgoing AAL2 connection is to be allocated. This determination may also involve signaling to other network nodes. In the case of UMTS UE paging, this node is BTS 210, under of which the UE is camping currently. In one embodiment of the invention only those call resources that are to be accessed via the ATM switch core and that thus require connection allocation are of interest. It should be noted that throughout the disclosure by a call resource is meant any connection, circuit, virtual circuit or device input/output connection, which is connected to call or packet data connection user plane via a switching matrix, preferably ATM switching core 100. The call resources include at least the suitable VCC, to which an outgoing AAL2 connection 154 is going to be accommodated, and the actual outgoing AAL2 connection itself. Similarly, if the incoming and outgoing AAL2 connections are going to be connected to each other via a DSP application in order to implement a media stream conversion, for example ciphering, the ATM connections 150, 152 have to be allocated that lead to TPG 124 that has plugged in it computer units 130, 132 hosting the required application. TPG 124 will take care of the routing of media streams between the computer unit hosting the required application and the incoming and outgoing ATM level connections 150, 152.

In one embodiment of the invention there is direct correspondence between the processing capacity of means for media stream processing and the total connection capacity permitted to them in the ATM switch core. Hereinafter, the media stream processing means are referred to as processing means for brevity. An example of such processing means are the DSP applications hosted in association with one TPG 124. In other words, a capacity slice from the processing means is allocated as a call resource by allocating connections of required bandwidth leading to the processing means from the switching core. In this sense only the caching of connections leading to the processing means is required in order to ensure the availability of such means for subsequent calls. The connection admission control of the switching system keeps track of the total allocated bandwidth leading to the processing means. Thus, only a limited number of connections to the processing means are admitted simultaneously. In other embodiments separate allocation means for the processing means is required.

After step 404 resource selector 352 checks for each call resource whether it is available in a connection cache 370.

In step 405 resource selector 352 checks the properties of a required call resource, and checks connection cache 370 for call resources with matching properties. If the switching system has performed a startup from scratch and no existing connections are available, connection cache 370 will be empty. The properties of the call resources preferable include for AAL2 connections the quality of service parameters, for example bitrate. Similarly, the properties may include information about the units or ports to which the connections start and end. The information about connection start and endpoint may also be in the form of an ATM VCI/VPI.

If connection cache 370 has a record of a call resource with matching properties, then in step 410 a decision to reuse a cached call resource and its accompanying connections is made by resource selector 352. If connection cache 370 does not have a record of a resource with matching properties, in step 408 the resource selector 352 prepares to build a new connection and returns information of the required call resources and their properties to the resource broker.

In step 412 resource selector 352 updates connection statistics stored by connection cache 370. The connection statistics are updated to include information about the required call resource. The connection statistics include preferably information such as the quality of service parameters for AAL2 connections. Necessarily, also the connection statistics specify all the needed information to determine whether the connection is of correct type, that is, what units it is connecting. For example, for an AAL2 connection there may be recorded the A2SP from which it starts and the TPG where it ends. Preferably, only those quality of service parameters are stored in statistics that are necessary for the matching of required AAL2 connections to suitable existing connections that have been cached to connection cache 370. One such quality of service parameter to be explicitly mentioned is the bitrate i.e. bandwidth of the AAL2 connection. In one embodiment of the invention, the statistics on AAL2 connections are grouped according to the VCC that is used to carry them. In other words, the statistics are VCC i.e. N-CID specific. The principle of the statistics is to gather information about most frequently used AAL2 connection types e.g. the most frequently used AAL2 connection bitrates. The statistics affect the functioning of connection cache 370 e.g. in the way that records on only those AAL2 connections that are used frequently enough are cached to connection cache 370. The procedure is similar relating to any other call resources and their accompanying connections. The call resource statistics are used to determine, whether or not it is probable that the kind of call resource is going to be used in the near future, that is, in a time frame specified.

In association with step 412 a decision whether or not it is necessary to retain the call resource at hand in connection cache 370 after the call has been released. In one embodiment of the invention, the call resource and its accompanying connections are recorded to the cache at this phase. In one embodiment of the invention, the information recorded to the connection cache includes for AAL2 connections the bitrate QoS parameter, CID and the VCC carrying the CID. For connections ending or starting in a TPG the information includes the ATM VCI and VPI to access the TPG in question, and optionally other computer unit addressing information. In those embodiments of the invention where the computer units plugged to a given TPG host only a limited set of DSP application types, the type of application must be also recorded. For ATM level connections, the information recorded includes the bitrate QoS parameter and the VCI and VPI. It should be noted that the recorded information must generally include the information necessary to reuse the call resources in association with a new call request and to connect the call resources to newly created non-cached call resources.

In step 414 it is checked whether more call resources and accompanying connections are needed for the call at hand. If more call resources are needed, processing continues from step 405. If more call resources are not needed, the processing continues at step 416.

In step 416 a resource broker 356 receives information on pending call resources and accompanying properties associated with them from the resource selector that were not available in connection cache 370. The resource broker forwards information on the pending call resources and the call resources that were available to a connection performer 360. Connection performer 360 issues ATM connection requests corresponding to the required ATM level connections to ATM switch core 368, AAL2 connection requests to the A2SP 364 and start requests to DSP applications in TPG 366. It should be noted that there may be several TPGs and A2SPs to which requests must be sent.

The method depicted in FIG. 4 and explained above can also be used in call i.e. session modification requests. The difference is that at step 400 a session modification request is received for an existing session instead of a call set-up request. The session modification request could typically provide information about a new communication path to be associated with the session. In the UMTS RAN the new communication path could be an AAL2 connection associated with CDMA macro diversity combining. In the case of an IP multimedia system, the new communication path could be a new parallel user-to-user communication path pertaining to a new media type to be associated with the session.

Figure 5:
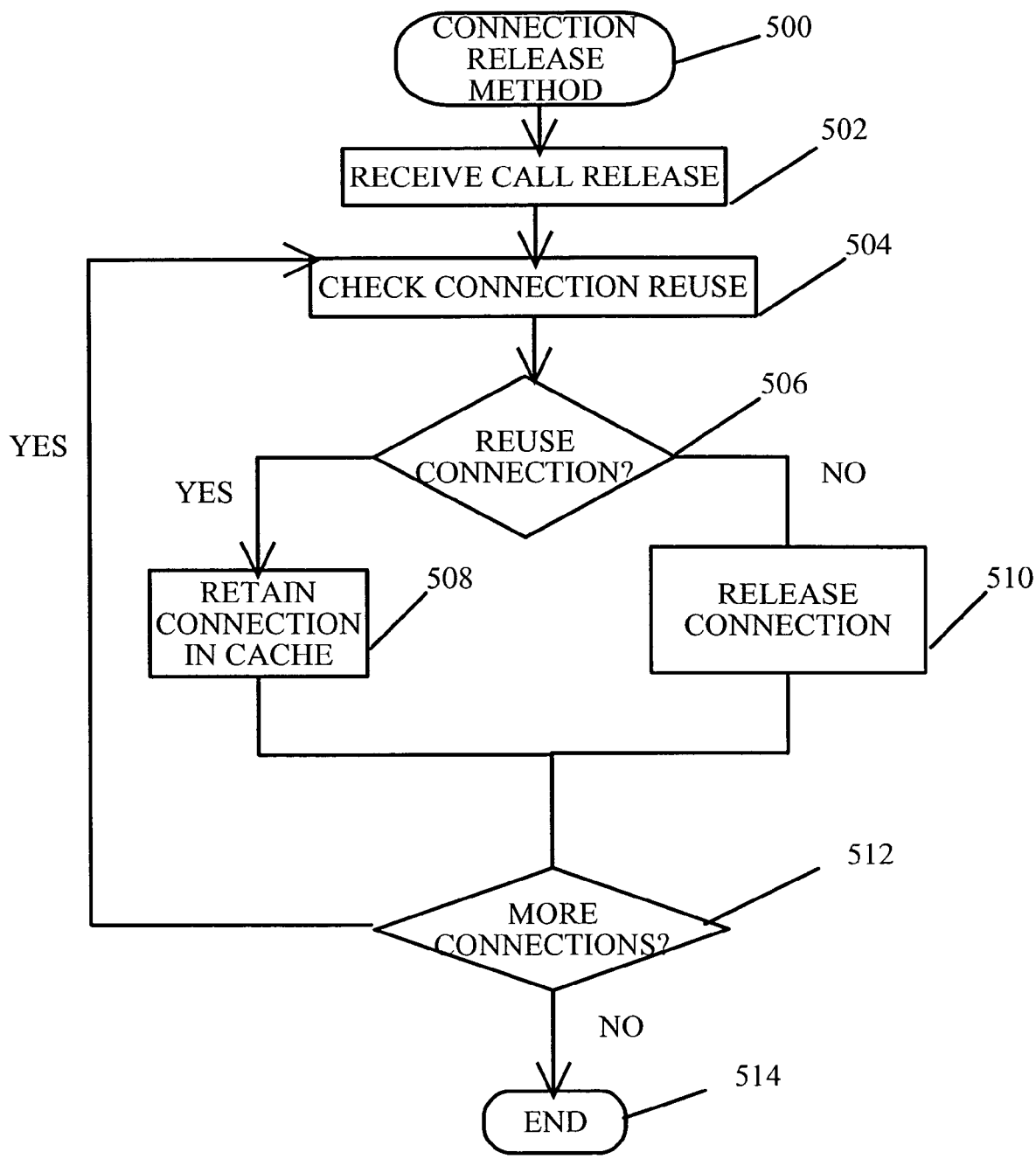
FIG. 5 is a flow chart depicting one embodiment of connection release in a system of FIG. 3, in accordance with the invention.

In FIG. 5 is illustrated a flow chart depicting one embodiment of connection release in a system of FIG. 3. The method applies as well to the set-up of calls and packet data connections.

In step 502 a call release request is received by a call control application 350. At this step call control application 350 issues a resource release request to a resource broker 356. After step 502, the reuse of each call resource associated with the call to be released is checked.

In step 504 resource broker 356 checks whether or not a given call resource and its accompanying connections have been determined during the connection setup step 412 as a call resource that must be retained in a connection cache 370 after the release of the call. If the call resource and its accompanying connections are to be reused, they are not released. In a one embodiment of the invention no messaging with connection cache 370 is required at step 508, since information on the call resource has already been recorded in step 412. In other embodiments the call resource information may be forwarded in step 508 to connection cache 370.

Figure 1:
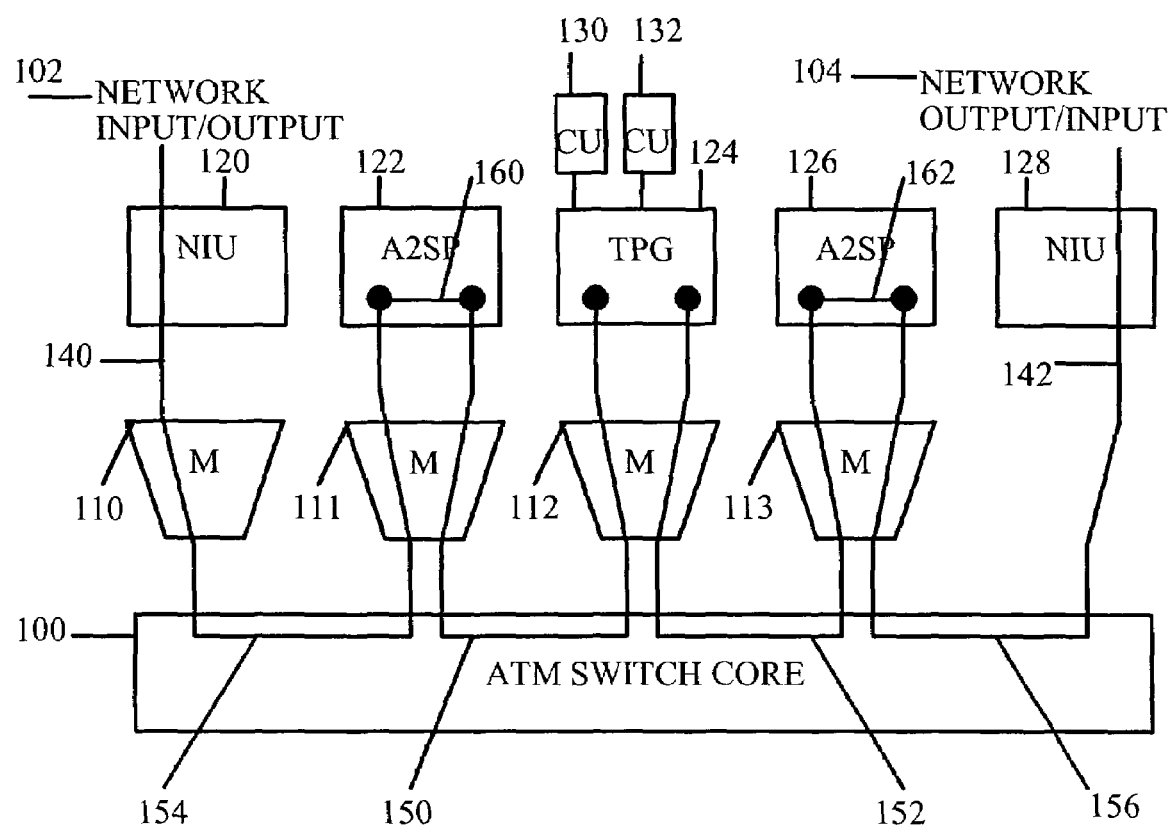
FIG. 1 (PRIOR ART) is a block diagram of prior art showing AAL2 switching system, FIG. 2A (PRIOR ART) is a block diagram of prior art showing a UMTS radio access network, FIG. 2B (PRIOR ART) is a block diagram of prior art UMTS radio network controller.
Figure 2A:
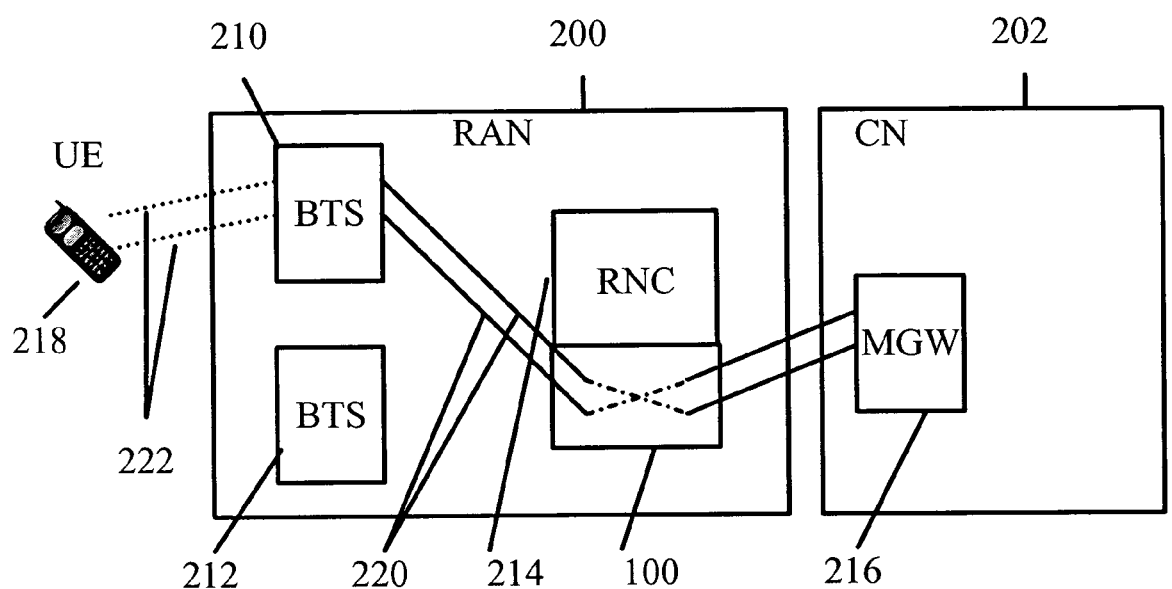
Figure 2B:
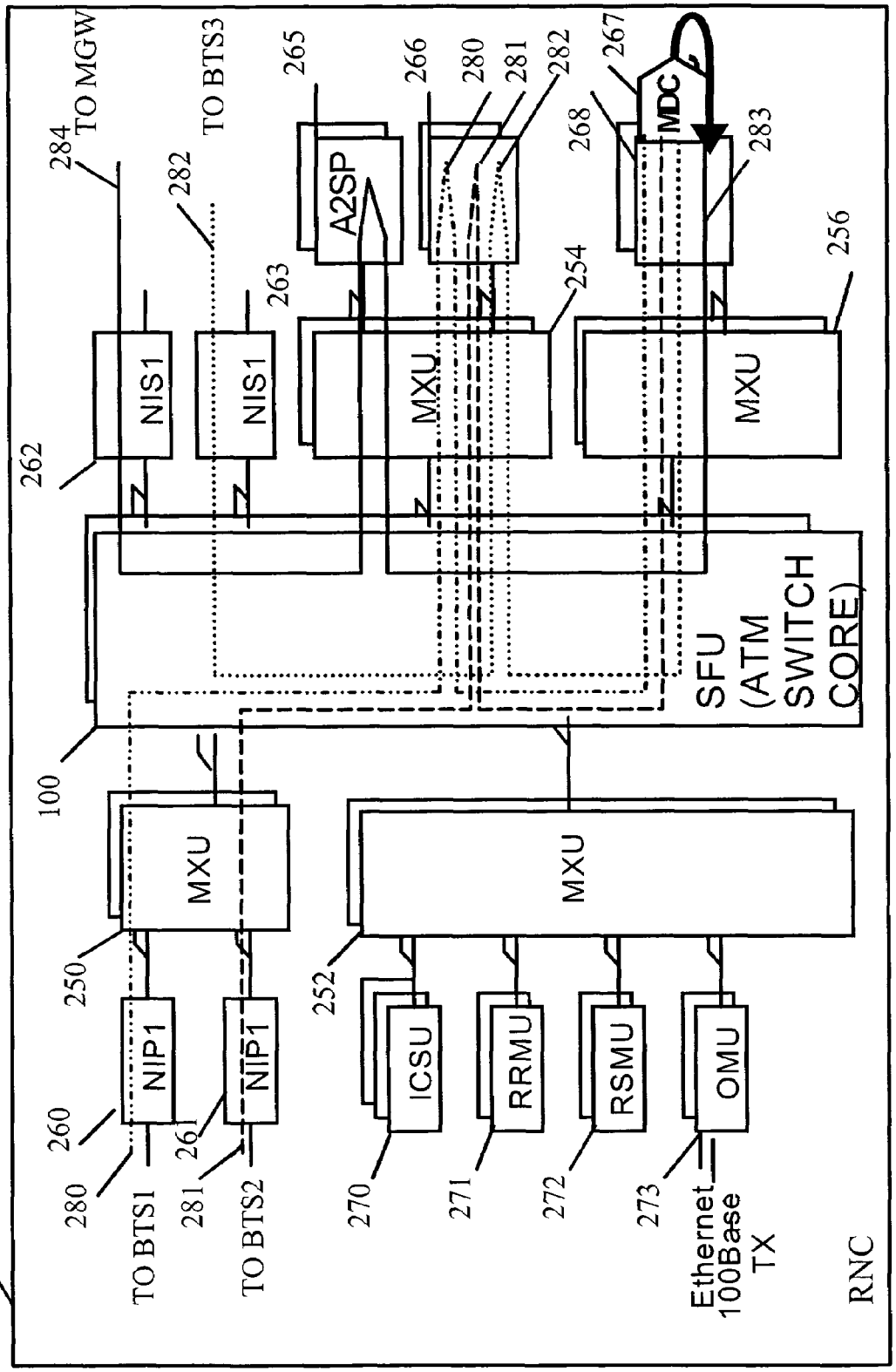

If the call resource and its accompanying connections are to be released, resource broker 356 issues in step 510 a request to a connection performer 360 and resource selector 352 to make the call resource and the accompanying connections available for other calls. For example, if a DSP application is to be released, also the ATM level connections connecting to it are as well released. In FIG. 1 such ATM level connections are 150 and 152. In one embodiment of the invention the resource selector 352 marks the call resources and the connections as available. Connection performer 360 may also issue, for example, requests to ATM switch core 368 to clear information pertaining to the released connections.

The method depicted in FIG. 5 and explained above can also be used in the call i.e. session modification requests. The difference is that at step 500 a session modification request is received instead of a session release request. The release request carries information about a communication path to be released from the session.

Figure 6:
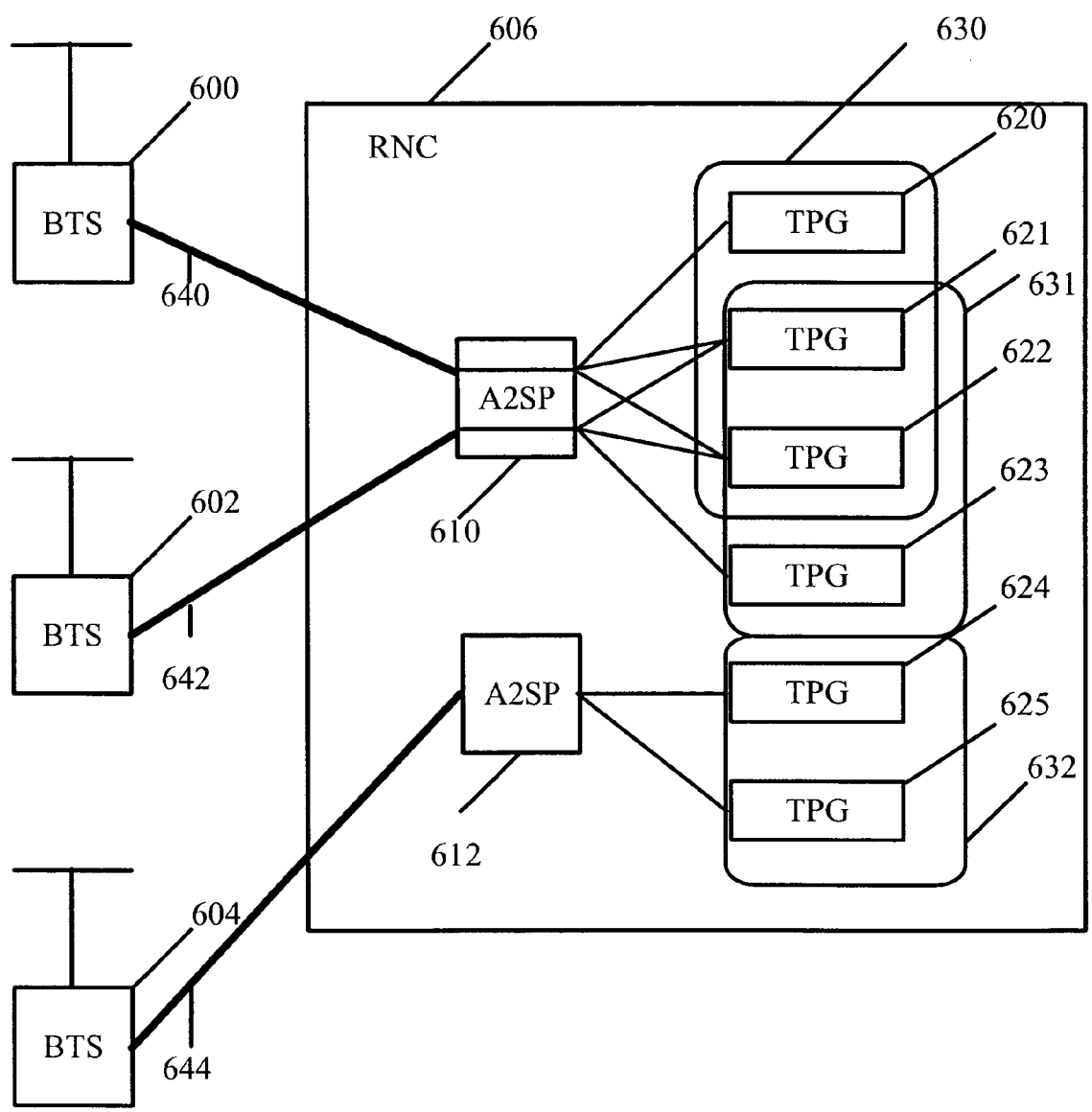
FIG. 6 is a block diagram depicting one embodiment of the use of the system of FIG. 3 in a UMTS radio access network.

In FIG. 6 is illustrated a block diagram depicting one embodiment of the invention where the use of connection cache 370 is made more effective when applied in a UMTS RNC 606. In this embodiment the tributary processor groups, TPGs 620-625 that have associated with them computer units hosting DSP applications, are grouped in TPG groups 630, 631, 632. The TPG groups 630, 631, 632 are dedicated to given VCCs i.e. N-CIDs. Each N-CID 640, 642, 644 has associated with it a given TPG group 630, 631, 632. Each N-CID terminates on the one end to a BTS 600-604 and on the other end to an A2SP 610, 612. Therefore, a given N-CID 640, 642, 644 is associated with a given cell or a small group of cells provided by one BTS 600-604. By having a given TPG group 630, 631, 632 associated with a given N-CID 640, 642, 644, it is possible to increase the probability of finding a suitable cached connection and a call resource that is already associated with the correct A2SP. For example, it is possible to find a suitable TPG and the accompanying ATM level connections 150, 152 from connection cache 370 that is readily connected to the correct A2SPs i.e. the A2SP, which has associated with it a call request that is being processed. The probability of finding a suitable cached connection and a call resource is inversely proportional to the ratio of the number of TPGs in TPG group 630, 631, 632 and the total number of TPGs in RNC 606. In one embodiment of the invention, the TPG groups 630, 631 associated with the N-CIDs 640, 642 leading to two neighboring BTSs 600, 602 are partially overlapping, that is, some TPGs belong to both TPG groups 630, 631. In this embodiment, the benefit is that connections between the neighboring BTSs via a TPG are likely to be cached and available for subsequent soft handovers. The TPG will then be required to access its plug-in computer unit to run the DSP application for macro diversity combining.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   collecting statistics associated with a frequency of use of at least one first quality of service parameter applied in session resources pertaining to said switching system;
   recording information to a connection cache pertaining to a session resource, if in said statistics said frequency of use of at least one second quality of service parameter associated with said session resource is high enough to warrant said recording, said information comprising said at least one second quality of service parameter;
   checking in the processing of a session establishment or modification request said connection cache for at least one matching session resource, for which said at least one second quality of service parameter matches properties required of said session resource, said at least one second quality of service parameter being among said at least one first quality of service parameter; and using said session resource in the establishment of at least one communication path pertaining to said session establishment or modification request.

2. The method according to claim 1, wherein at least one of said session resources is a cross-connection in a switch.

3. The method according to claim 2, wherein said cross connection is an asynchronous transfer mode level virtual circuit connection and said switch is an asynchronous transfer mode switching core.

4. The method according to claim 1, wherein at least one of said session resources is a connection to a computer unit hosting a digital signaling processing application.

5. The method according to claim 4, wherein said computer unit is grouped into at least one computer unit group, computer units from said computer unit group being used for sessions associated with predefined incoming or outgoing connections.

6. The method according to claim 1, wherein at least one of said session resources is a media stream processor.

7. The method according to claim 1, wherein said matching utilizes at least one quality of service parameter pertaining to the session request.

8. The method according to claim 7, wherein said quality of service parameter is bitrate.

9. The method according to claim 1, wherein said switching system is an asynchronous transfer mode switching system.

10. The method according to claim 1, wherein said switching system is a universal mobile telecommunications system radio network controller.

11. A system, comprising:
means for switching communication paths;
means for receiving session establishment or modification requests;
means for collecting statistics on a frequency of use of at least one first quality of service parameter applied in session resources used by sessions pertaining to said session establishment or modification requests;
a connection cache for recording information pertaining to a session resource, if in said statistics said frequency of use of at least one second quality of service parameter associated with said session resource is high enough to warrant said recording, said information comprising said at least one second quality of service parameter, said at least one second quality of service parameter being among said at least one first quality of service parameter; and
means for reusing said session resource, the information of which has been stored in said connection cache, in the context of a new session establishment or modification request.

12. The system according to claim 11, wherein at least one of said session resources is a cross-connection in a switch.

13. The system according to claim 11, wherein said cross-connection is an asynchronous transfer mode level virtual circuit connection and said switch is an asynchronous transfer mode switching core.

14. The system according to claim 11, wherein at least one of said session resources is a connection to a computer unit hosting a digital signaling processing application.

15. The system according to claim 11, wherein at least one of said session resources is a media stream processing means.

16. The system according to claim 11, wherein said switching system is an asynchronous transfer mode switching system.

17. The system according to claim 11, wherein said switching system is a universal mobile telecommunications system radio network controller.

18. The system according to claim 14, wherein said computer unit is grouped into at least one computer unit group, computer units from said computer unit group being used for sessions associated with predefined incoming or outgoing connections.

19. A node, comprising:
means for receiving session establishment or modification requests;
means for collecting statistics regarding a frequency of use of at least one first quality of service parameter applied in session resources used by sessions pertaining to said session establishment or modification requests;
a connection cache for recording information pertaining to said session resource, if in said statistics said frequency of use of at least one second quality of service parameter associated with said session resource is high enough to warrant said recording, said information comprising said at least one second quality of service parameter, said at least one second quality of service parameter being among said at least one first quality of service parameter; and
means for reusing said session resource, the information of which has been stored in said connection cache, in the context of a new session establishment or modification request.

20. A node, comprising:
a call control application configured to receive session establishment or modification requests;
a resource selector application configured to collect statistics regarding a frequency of use of at least one first quality of service parameter value applied in session resources used by sessions pertaining to said session establishment or modification requests;
a connection cache configured to record information pertaining to a session resource, if in said statistics said frequency of use of at least one second quality of service parameter associated with said session resource is high enough to warrant said recording, said information comprising said at least one second quality of service parameter, said at least one second quality of service parameter being among said at least one first quality of service parameter; and
said resource selector application configured to reuse a session resource, the information of said session resource is stored in said connection cache.

21. The node according to claim 20, wherein at least one of said session resources is a cross-connection in a switch.

22. The node according to claim 21, wherein said cross-connection is an asynchronous transfer mode level virtual circuit connection and said switch is an asynchronous transfer mode switch.

23. The node according to claim 20, wherein at least one of said session resources is a connection to a computer unit hosting a digital signaling processing application.

24. The node according to claim 23, wherein said computer unit is grouped into at least one computer unit group, computer units from said computer unit group being preferred for sessions associated with predefined incoming or outgoing connections.

25. The node according to claim 20, wherein at least one of said session resources is a media stream processing means.

26. The node according to claim 20, wherein said telecommunications system is a universal mobile telecommunications system.

27. The node according to claim 26, wherein said node is a radio network controller.

* * * * *